(12) United States Patent
Mehta (10) Patent No.: US 8,074,111 B1
(45) Date of Patent: Dec. 6, 2011

(54) SYSTEM AND METHOD FOR RESPONDING TO FAILURE OF A HARDWARE LOCUS AT A COMMUNICATION INSTALLATION

(75) Inventor: Sandeep Mehta, Apex, NC (US)

(73) Assignee: Nortel Networks, Ltd., Mississauga, Ontario (CA)

( * ) Notice: Subject to any disclaimer, the term of this patent is extended or adjusted under 35 U.S.C. 154(b) by 613 days.

(21) Appl. No.: 11/523,195

(22) Filed: Sep. 18, 2006

(51) Int. Cl.
*G06F 11/00* (2006.01)
(52) U.S. Cl. .......................................... 714/13
(58) Field of Classification Search ............. 714/13
See application file for complete search history.

(56) References Cited

U.S. PATENT DOCUMENTS

| 7,185,228 | B2* | 2/2007 | Achiwa | 714/20 |
| 7,293,194 | B2* | 11/2007 | Kawamura et al. | 714/7 |
| 2003/0129772 | A1* | 7/2003 | Choi | 438/4 |
| 2005/0193245 | A1* | 9/2005 | Hayden et al. | 714/13 |
| 2006/0048014 | A1* | 3/2006 | Takahashi et al. | 714/44 |
| 2007/0220223 | A1* | 9/2007 | Boyd et al. | 711/162 |
| 2007/0234115 | A1* | 10/2007 | Saika | 714/13 |
| 2008/0172572 | A1* | 7/2008 | Beardsley et al. | 714/6 |
| 2008/0178041 | A1* | 7/2008 | Takahashi et al. | 714/6 |
| 2010/0049823 | A1* | 2/2010 | Saigo et al. | 709/216 |

OTHER PUBLICATIONS

Sanrad, Sanrad Global Data Replication and Disaster Recovery Solution 2005, Sanrad, WP-009-01, 4,11, 17.*

* cited by examiner

*Primary Examiner* — Amine Riad
(74) *Attorney, Agent, or Firm* — Law Office of Donald D. Mondul (57) ABSTRACT

A method for responding to a failure of hardware locus of at a communication installation having a plurality of control apparatuses for controlling a plurality of processes distributed among a plurality of hardware loci, the hardware loci including at least one spare hardware locus, includes the steps of: (a) Shifting control of a failed process from an initial control apparatus to an alternate control apparatus located at an alternate hardware locus than the failed hardware locus. The failed process is a respective process controlled by the initial control apparatus located at the failed hardware locus. (b) Relocating the respective control apparatuses located at the failed hardware locus to a spare hardware locus. (c) Shifting control of the failed process from the alternate control apparatus to the initial control apparatus relocated at the spare hardware locus.

18 Claims, 7 Drawing Sheets

SYSTEM AND METHOD FOR RESPONDING TO FAILURE OF A HARDWARE LOCUS AT A COMMUNICATION INSTALLATION

FIELD OF THE INVENTION

The present invention relates to controlling operation of a communication installation in a communication system, and in particular to controlling operation of a communication installation in response to a failure of a hardware unit at the communication installation.

BACKGROUND OF THE INVENTION

Today's communication systems are operated at a high level of reliability. One way such reliability is achieved is by operating equipment at a communication installation using a one-to-one redundancy arrangement by which a hot standby equipment unit-mate is kept ready to assume the role of a primary equipment unit in the event of failure of the primary equipment unit. Failure of a first hardware locus at which is located a primary equipment unit may therefore be substantially instantaneously remedied by employing the assigned standby equipment unit-mate—preferably located at a different hardware locus than the first hardware locus.

Equipping for such a one-to-one back-up capability requires equipping with redundant hardware. Equipping with redundant hardware can be an expensive endeavor, especially since the processing power of the standby equipment unit-mate can be required to nothing more than data-synchronize with the primary equipment unit, which in many situations assures that the standby equipment unit-mate is under-utilized.

There is a need for a system and method for responding to a failure of a hardware locus at a communication installation that avoids providing redundant hardware for one-to-one equipment redundancy.

SUMMARY OF THE INVENTION

A method for responding to a failure of hardware locus at a communication installation having a plurality of control apparatuses for controlling a plurality of processes distributed among a plurality of hardware loci, the hardware loci including at least one spare hardware locus, includes the steps of: (a) Shifting control of a failed process from an initial control apparatus to an alternate control apparatus located at an alternate hardware locus than the failed hardware locus. The failed process is a respective process controlled by the initial control apparatus located at the failed hardware locus. (b) Relocating the respective control apparatuses located at the failed hardware locus to a spare hardware locus. (c) Shifting control of the failed process from the alternate control apparatus to the initial control apparatus relocated at the spare hardware locus.

A system for effecting continuity of operation in response to failure of a failed hardware locus of a plurality of hardware loci is used at a communication installation that includes a plurality of control apparatuses for controlling a plurality of processes distributed among the plurality of hardware loci. Each respective process of the plurality of processes is controlled by one of a respective first control apparatus of the plurality of control apparatuses or a respective second control apparatus of the plurality of control apparatuses. The respective first control apparatus and the respective second control apparatus associated with a particular the respective process are located at different hardware loci of the plurality of hardware loci. The plurality of hardware loci includes at least one spare hardware locus. No respective first control apparatus and no respective second control apparatus are initially located at any respective spare hardware locus. The system includes: a control unit coupled with the plurality of control apparatuses for effecting a shifting of control of a failed process to an alternate control apparatus located at an alternate hardware locus than the failed hardware locus. The failed process is a respective process controlled by one control apparatus of the first control apparatus and the second control apparatus located at the failed hardware locus. The alternate control apparatus is the other control apparatus of the first control apparatus and the second control apparatus. The alternate hardware locus is the respective hardware locus at which is located the other control apparatus. The control unit effects relocation of the respective control apparatuses located at the failed hardware locus to a respective spare hardware locus. The control unit effects a shifting of control of the failed process from the other control apparatus to the one control apparatus relocated at the respective spare hardware locus.

It is therefore a feature of the present invention to provide a system and method for responding to a failure of a hardware locus at a communication installation that avoids providing redundant hardware for one-to-one equipment redundancy.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
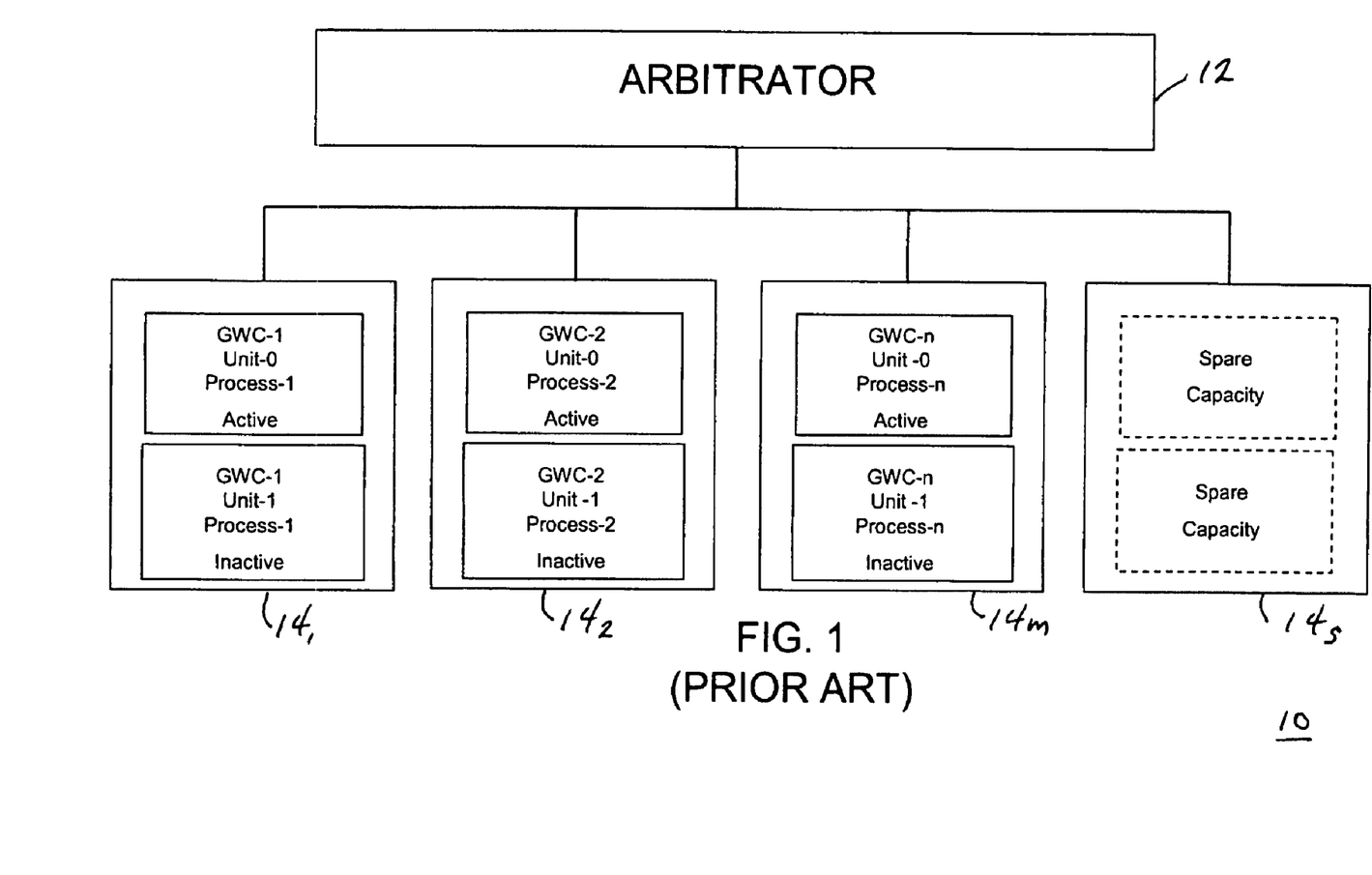
FIG. 1 is a schematic diagram of a prior art arrangement of control apparatuses among a plurality of hardware loci at a communication installation.

FIG. 1 is a schematic diagram of a prior art arrangement of control apparatuses among a plurality of hardware loci at a communication installation. In FIG. 1, a communication installation 10 includes an arbitrator unit 12 coupled with a plurality of hardware loci $14_1$, $14_2$, $14_m$, $14_s$. Hardware locus $14_s$ is a spare hardware locus. The indicator "m" is employed to signify that there can be any number of hardware loci in communication installation 10. The inclusion of three hardware loci $14_1$, $14_2$, $14_m$ and spare hardware locus $14_s$ in FIG. 1 is illustrative only and does not constitute any limitation regarding the number of hardware loci or the number of spare hardware loci that may be included in the communication installation of the present invention.

Each respective hardware locus $14_m$ includes control apparatuses for controlling processes at communication installation 10. The various control apparatuses are controlled by arbitrator unit 12. One may observe that a first control apparatus and a second control apparatus controlling a particular process are co-located at each respective hardware locus $14_m$. More than two control apparatuses may be located at a respective hardware locus $14_m$. However, prior art configurations provided for first and second control apparatuses for a particular process to be co-located at a respective hardware locus $14_m$.

Thus, hardware locus $14_1$ includes control apparatuses GWC-1/Unit-0, GWC-1/Unit-1 (referred to here by way of example and not by way of limitation, as Gate Way Controller (GWC)). Control apparatus GWC-1/Unit-0 is active—controlling Process-1. Control apparatus GWC-1/Unit-1 is inactive standing by for backing up control apparatus GWC-1/Unit-0 should control apparatus GWC-1/Unit-0 fail.

Hardware locus $14_2$ includes control apparatuses GWC-2/Unit-0, GWC-2/Unit-1. Control apparatus GWC-2/Unit-0 is active—controlling Process-2. Control apparatus GWC-2/Unit-1 is inactive standing by for backing up control apparatus GWC-2/Unit-0 should control apparatus GWC-2/Unit-0 fail.

Hardware locus $14_m$ includes control apparatuses GWC-n/Unit-0, GWC-n/Unit-1. The indicator "n" is employed to signify that there can be any number of Gate Way Controllers (GWCs) in communication installation 10. The inclusion of three Gate Way Controllers GWC-1, GWC-2, GWC-n in FIG. 1 is illustrative only and does not constitute any limitation regarding the number of GWCs that may be included in the communication installation of the present invention. Control apparatus GWC-n/Unit-0 is active—controlling Process-n. Control apparatus GWC-n/Unit-1 is inactive standing by for backing up control apparatus GWC-n/Unit-0 should control apparatus GWC-n/Unit-0 fail.

Hardware locus $14_s$ is a spare hardware locus having capacity for receiving or hosting two (or more) control apparatuses of the sort located at hardware loci $14_1$, $14_2$, $14_m$.

Because of the prior art arrangement co-locating the primary and secondary control apparatuses controlling a particular process, as indicated in FIG. 1, when a hardware locus $14_m$ failed, both of the control apparatuses for the particular affected process had to be moved to a spare hardware locus $14_s$. When a hardware locus $14_m$ failed, the control units located at the failed hardware locus were moved to a spare hardware locus $14_s$ and remained at the spare hardware locus $14_s$ until the failed hardware locus was repaired. Accordingly, for reliability of operation it was necessary in such prior art configurations to provide one-to-one redundancy of spare hardware loci $14_s$ for each occupied hardware locus $14_1$, $14_2$, $14_m$ (only one representative spare hardware locus $14_s$ is illustrated in FIG. 1).

Figure 2:
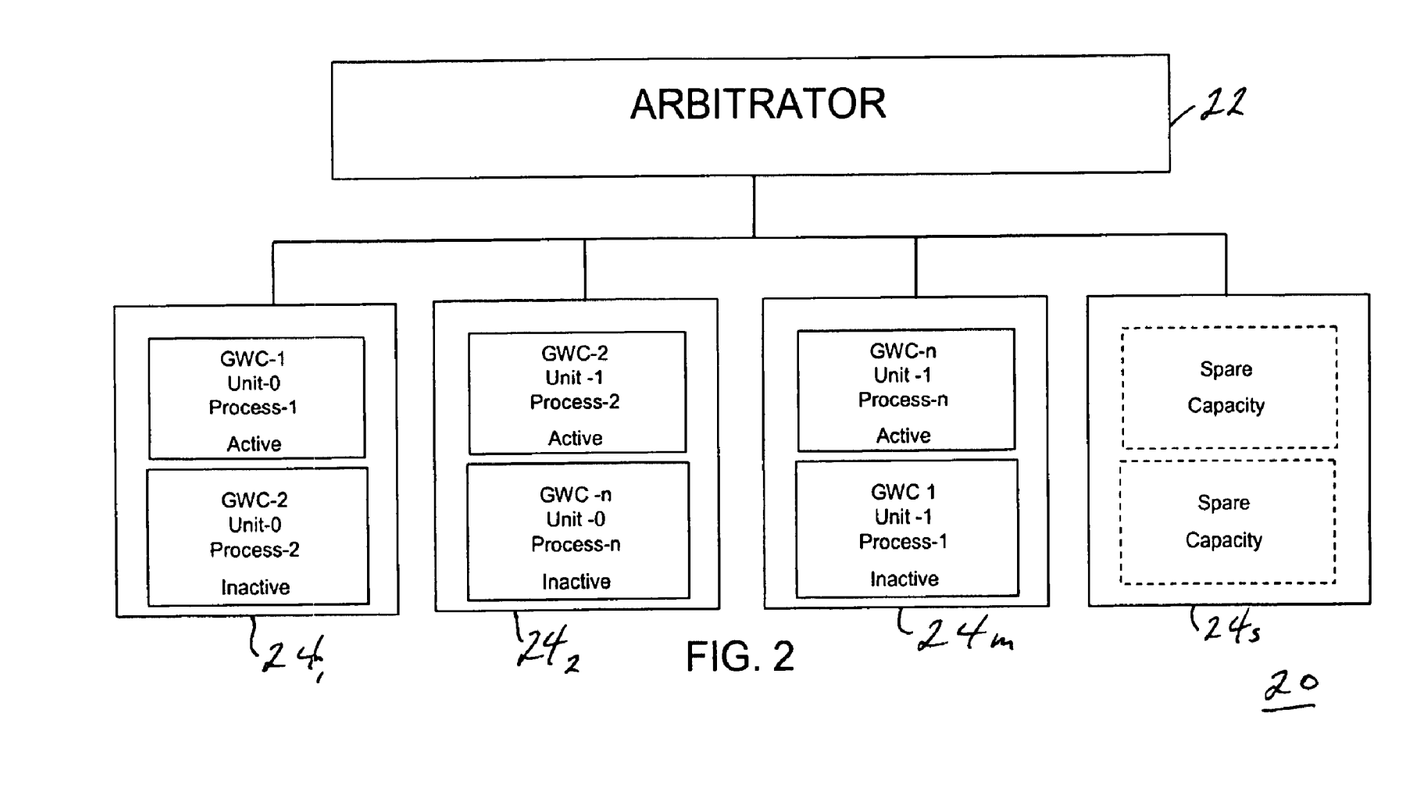
FIG. 2 is a schematic diagram of a preferred arrangement of control apparatuses among a plurality of hardware loci at a communication installation established according to the teachings of the present invention.

FIG. 2 is a schematic diagram of a preferred arrangement of control apparatuses among a plurality of hardware loci at a communication installation established according to the teachings of the present invention. In FIG. 2, a communication installation 20 includes an arbitrator unit 22 coupled with a plurality of hardware loci $24_1$, $24_2$, $24_m$, $24_s$. Hardware locus $24_s$ is a spare hardware locus. The indicator "m" is employed to signify that there can be any number of hardware loci in communication installation 20. The inclusion of three hardware loci $24_1$, $24_2$, $24_m$ and spare hardware locus $24_s$ in FIG. 2 is illustrative only and does not constitute any limitation regarding the number of hardware loci or the number of spare hardware loci that may be included in the communication installation of the present invention.

Each respective hardware locus $24_m$ includes control apparatuses for controlling processes at communication installation 20. The various control apparatuses are controlled by arbitrator unit 22. One may observe that the present invention provides that a first control apparatus and a second control apparatus controlling a particular process are not co-located at each respective hardware locus $24_m$. More than two control apparatuses may be located at a respective hardware locus $24_m$. However, the present invention provides that first and second control apparatuses for a particular process are not to be co-located at a respective hardware locus $24_m$.

Further, the present invention also preferably locates control apparatuses so that both of the control apparatuses located at a respective hardware locus $24_m$ are not active in controlling operation of a process.

Thus, hardware locus $24_1$ includes control apparatuses GWC-1/Unit-0, GWC-2/Unit-0. Control apparatus GWC-1/Unit-0 is active—controlling Process-1. Control apparatus GWC-2/Unit-0 is inactive standing by for backing up control apparatus GWC-2/Unit-1 located at hardware locus $24_2$ should control apparatus GWC-2/Unit-1 fail.

Hardware locus $24_2$ includes control apparatuses GWC-2/Unit-1, GWC-n/Unit-0. The indicator "n" is employed to signify that there can be any number of Gate Way Controllers (GWCs) in communication installation 20. The inclusion of three Gate Way Controllers GWC-1, GWC-2, GWC-n in FIG. 2 is illustrative only and does not constitute any limitation regarding the number of GWCs that may be included in the communication installation of the present invention. Control apparatus GWC-2/Unit-1 is active—controlling Process-2. Control apparatus GWC-n/Unit-0 is inactive standing by for backing up control apparatus GWC-n/Unit-1 located at hardware locus $24_m$ should control apparatus GWC-n/Unit-1 fail.

Hardware locus $24_m$ includes control apparatuses GWC-n/Unit-1, GWC-1/Unit-1. Control apparatus GWC-n/Unit-1 is active—controlling Process-n. Control apparatus GWC-1/Unit-1 is inactive standing by for backing up control apparatus GWC-1/Unit-0 located at hardware locus $24_1$ should control apparatus GWC-1/Unit-0 fail.

Hardware locus $24_s$ is a spare hardware locus having capacity for receiving or hosting two (or more) control apparatuses of the sort located at hardware loci $24_1$, $24_2$, $24_m$.

Figure 3:
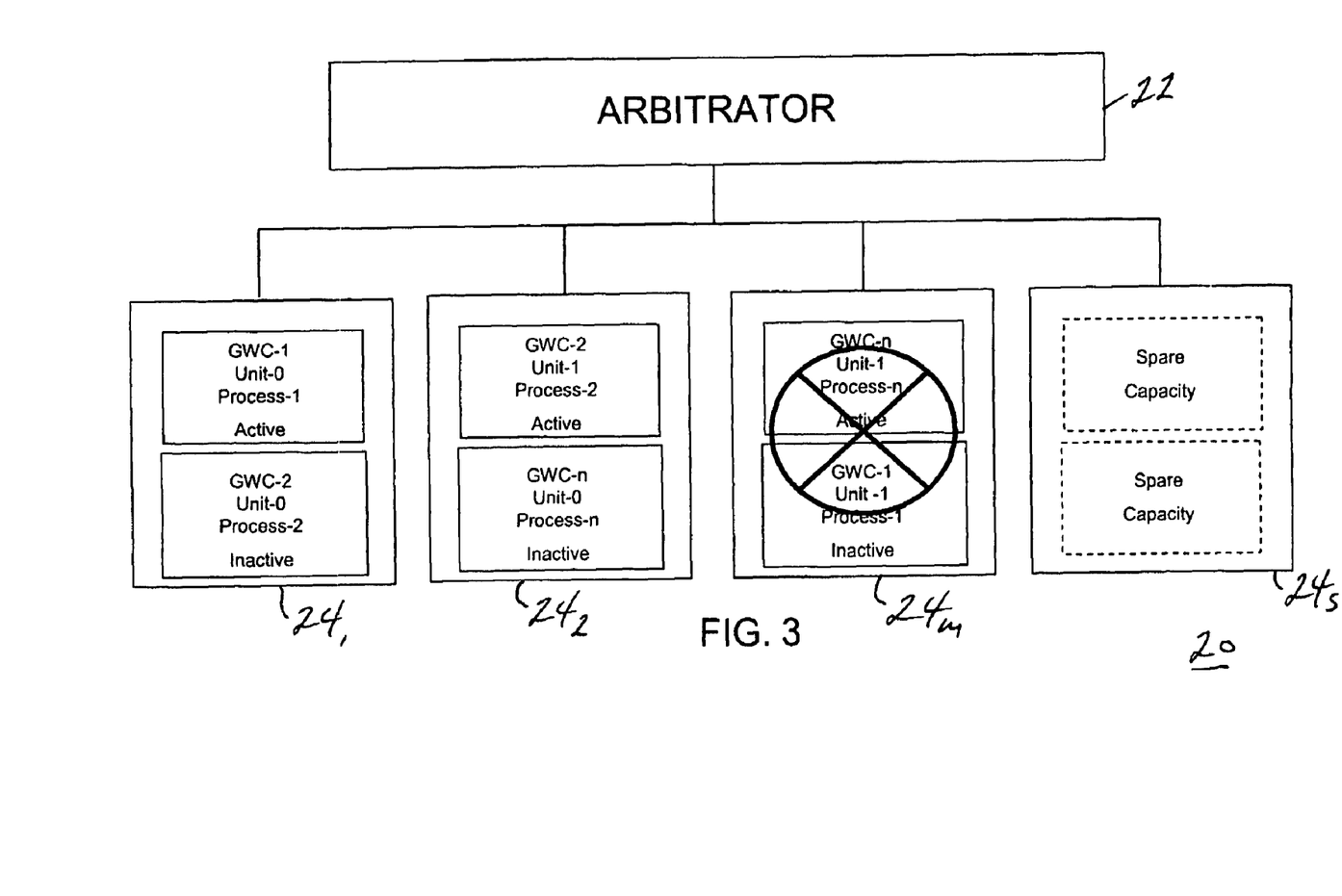
FIG. 3 is a schematic diagram indicating a failed hardware locus among hardware loci in the arrangement of control apparatuses illustrated in FIG. 2.
Figure 4:
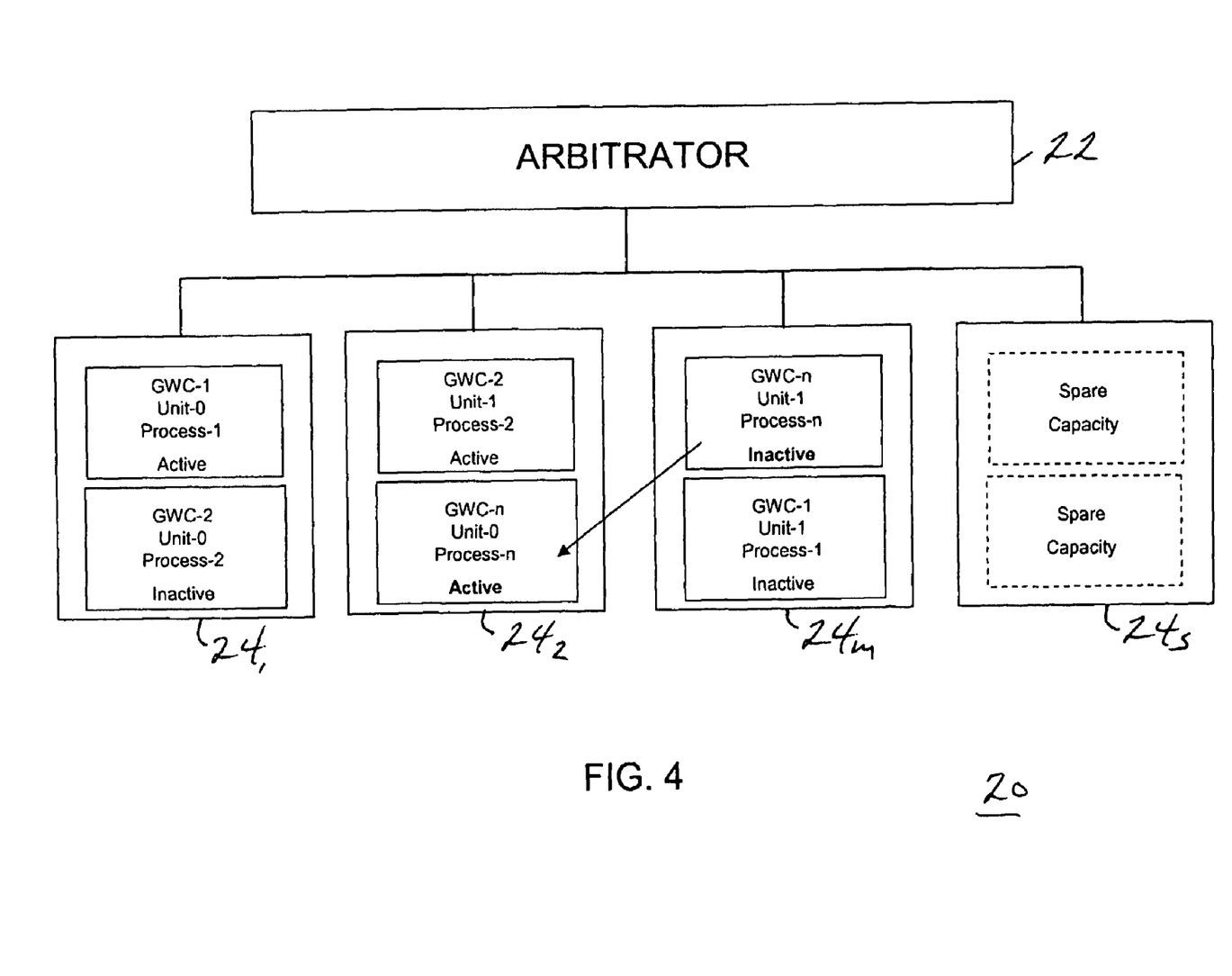
FIG. 4 is a schematic diagram indicating a shifting control of a process to a second control apparatus in response to the failed hardware locus illustrated in FIG. 3.

FIG. 3 is a schematic diagram indicating a failed hardware locus among hardware loci in the arrangement of control apparatuses illustrated in FIG. 2. FIG. 4 is a schematic diagram indicating a shifting control of a process to a second control apparatus in response to the failed hardware locus illustrated in FIG. 3. Regarding FIGS. 3 and 4 together, communication installation 20 is configured substantially similar to the configuration of communication installation 20 described in connection with FIG. 2. In order to avoid prolixity, only pertinent portions of communication installation 20 will be described sufficient to illustrate the operation of the present invention.

In FIG. 3, hardware locus $24_m$ has failed, as indicated by the "X" notation superimposed upon hardware locus $24_m$. Failure of hardware locus $24_m$ is noted by arbitrator unit 22. Failure of hardware locus $24_m$ does not have an immediate effect relating to Process-1 because control apparatus GWC-1/Unit-1 located at hardware locus $24_m$ is inactive. However, failure of hardware locus $24_m$ has an effect on Process-n because control apparatus GWC-n/Unit-1 located at hardware locus $24_m$ is active and is effecting control of Process-n. Arbitrator unit 22 is programmed or otherwise instructed to respond to failure of hardware unit $24_m$ by first shifting control of active control unit GWC-n/Unit-1 to a backup control apparatus for Process-n: GWC-n/Unit-0, located at hardware locus $24_2$, as indicated in FIG. 4.

As indicated in FIG. 4, arbitrator unit 22 has responded to failure of hardware unit $24_m$ to assure continuity of operation of Process-n. Process-n is now (FIG. 4) controlled by control apparatus GWC-n/Unit-0, located at hardware locus $24_2$. However, Process-1 and Process-n (in the situation indicated in FIG. 4) have no backup control apparatuses because control apparatuses GWC-n/Unit-1 and GWC-1/Unit-1 are located at a failed hardware locus $24_m$.

Figure 5:
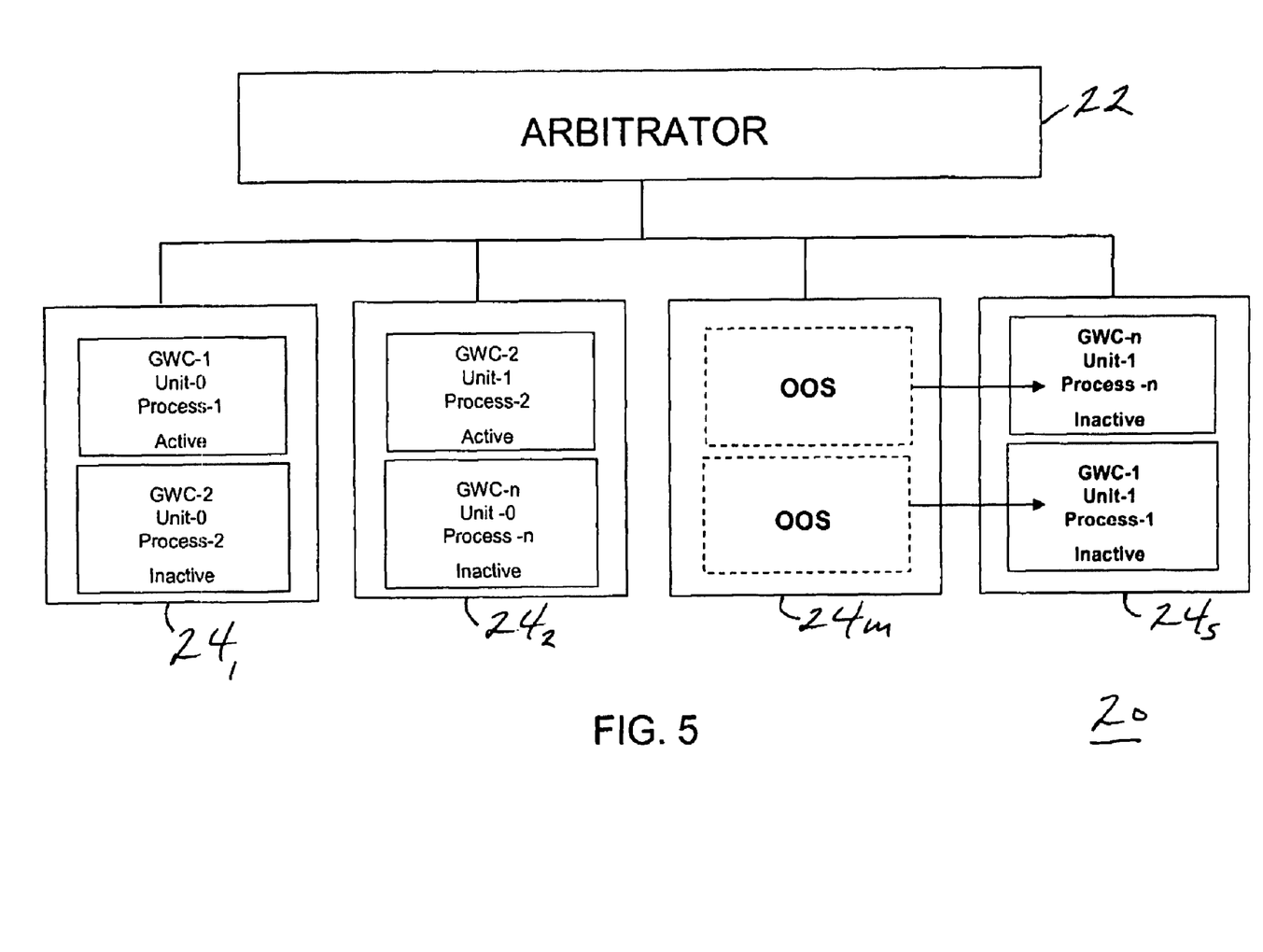
FIG. 5 is a schematic diagram indicating shifting location of control apparatuses away from the failed hardware locus illustrated in FIG. 3.

FIG. 5 is a schematic diagram indicating shifting location of control apparatuses away from the failed hardware locus illustrated in FIG. 3. Regarding FIG. 5, communication installation 20 is configured substantially similar to the configuration of communication installation 20 described in connection with FIGS. 2-4. In order to avoid prolixity, only pertinent portions of communication installation 20 will be described sufficient to illustrate the operation of the present invention. In FIG. 5, after arbitrator unit 22 has shifted control of Process-n to control apparatus GWC-n/Unit-0 located at hardware locus $24_2$ (FIG. 4), control apparatuses GWC-n/Unit-1 and GWC-1/Unit-1 are relocated to spare hardware locus $24_s$. This action permits continuity of operational availability of control apparatuses GWC-n/Unit-1 and GWC-1/Unit-1 so that Process-1 and Process-n have backup control apparatuses available, now located at spare hardware locus $24_s$. Relocating control apparatuses GWC-n/Unit-1 and GWC-1/Unit-1 to spare hardware locus $24_s$ also makes failed hardware locus $24_m$ (labeled "OOS"; Out Of Service) available for repair.

However, because control of Process-n has been shifted to control apparatus GWC-n/Unit-0 at hardware locus $24_2$, there are now two active control apparatuses located at hardware locus $24_2$: GWC-2/Unit-1 and GWC-n/Unit-O. This condition—having two active control apparatuses located at a respective hardware locus—is not desired.

Figure 6:
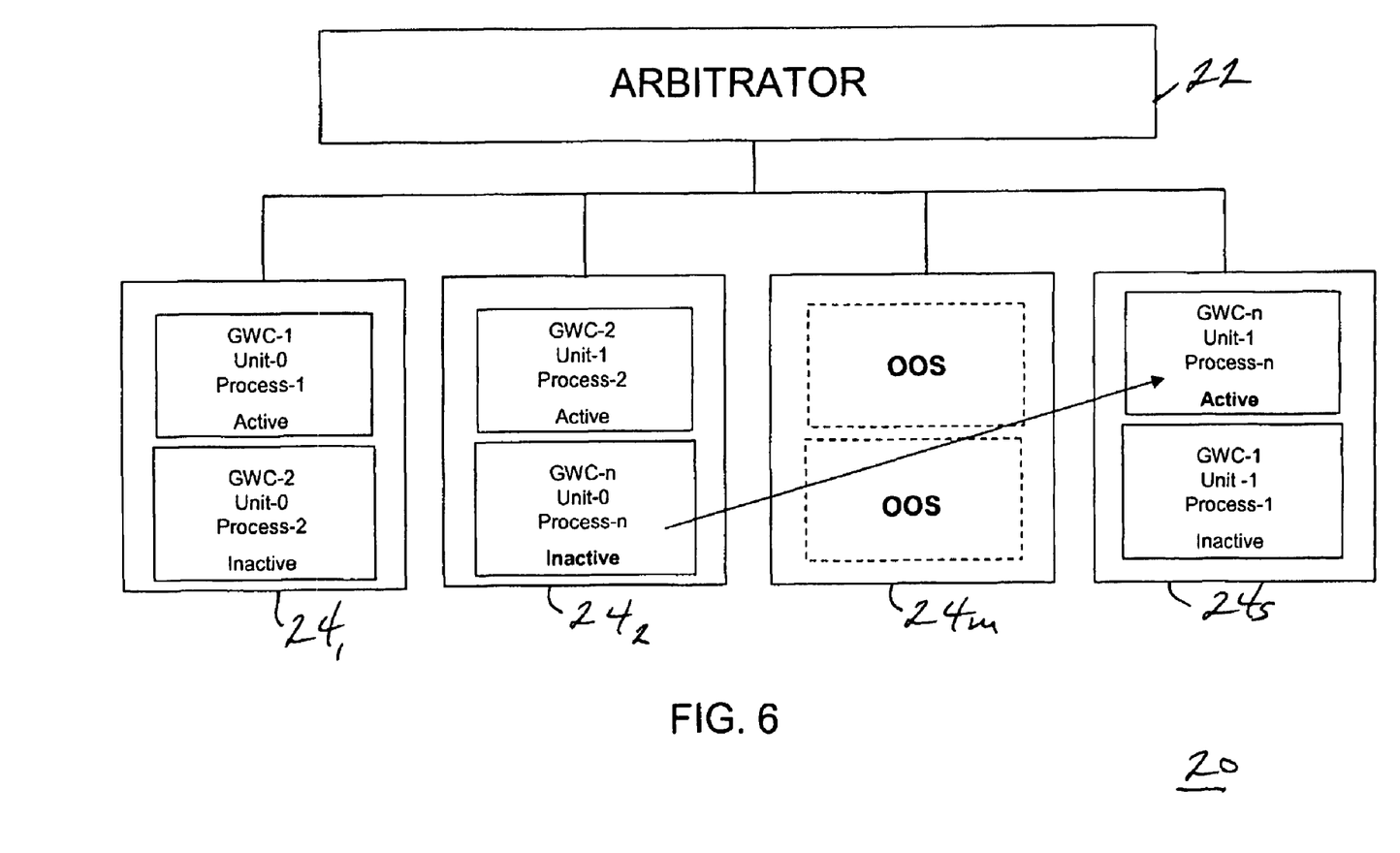
FIG. 6 is a schematic diagram indicating a shifting control of a process back to the control apparatus originally controlling the process before the failure of a hardware locus illustrated in FIG. 3.

FIG. 6 is a schematic diagram indicating a shifting control of a process back to the control apparatus originally controlling the process before the failure of a hardware locus illustrated in FIG. 3. Regarding FIG. 6, communication installation 20 is configured substantially similar to the configuration of communication installation 20 described in connection with FIGS. 2-5. In order to avoid prolixity, only pertinent portions of communication installation 20 will be described sufficient to illustrate the operation of the present invention. In FIG. 6, arbitrator unit 22 takes action to remedy having two active control apparatuses located at hardware locus $24_2$ by shifting control of Process-n back to control apparatus GWC-n/Unit-1, now located at spare hardware locus $24_s$.

Because the present invention does not co-locate the primary and secondary control apparatuses controlling a particular process and because only one of two control apparatuses at a respective hardware locus is active, as indicated in FIGS. 2-6, when a hardware locus $24_m$ fails, control for a process affected by failure of the respective hardware locus $24_m$ need only be moved to another hardware location (by arbitrator unit 22). This is so because the present invention assures that an inactive control apparatus for a respective process is not co-located with an active control apparatus for the respective process, as was the situation in prior art communication installation 10 (FIG. 1). By this new arrangement, failure of a respective hardware locus $24_m$ will not result in loss of both active and inactive control apparatuses for the respective process. One result of this arrangement is that there is no longer a necessity for one-to-one redundancy between spare hardware loci $24_s$ and active hardware loci $24_m$. To be sure, redundancy is necessary to assure reasonable reliability of operation by communication installation 20. However, one skilled in the design of communication installations will recognize that a less than one-to-one redundancy will provide sufficient reliability of operation, especially in a communication installation 20 having a large number of hardware loci $24_m$. This is so because a failure of a hardware locus $24_m$ does not assure loss of all control capability for a respective process, as is the case in prior art communication installation 10 (FIG. 1) in which both active and inactive control apparatuses for a respective process are co-located at a respective hardware locus $14_m$. In contrast, the present invention assures that failure of a hardware locus $24_m$ merely necessitates migration or reassignment of control of a process to another hardware locus at which a second control apparatus for the respective process is located.

Further, by assuring that both control apparatuses located at a respective hardware locus are not active, only one process is affected by failure of a hardware locus. One skilled in the art of communication installation design may recognize that the example here assigning only two control apparatuses to a respective hardware locus is representative only and that the teachings of the present invention may readily be applied to a communication installation having greater than two control apparatuses located at a respective hardware locus $24_m$.

Figure 7:
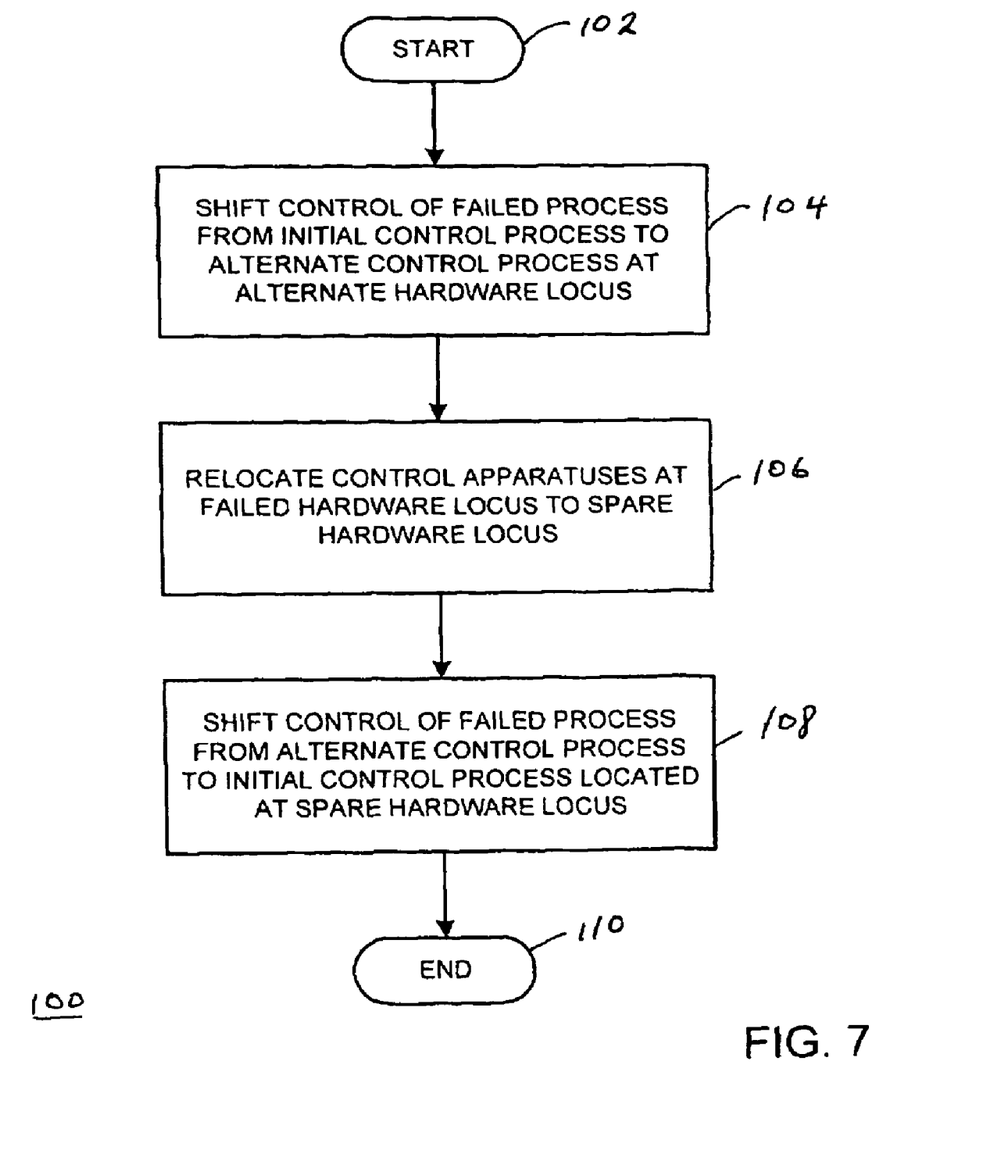
FIG. 7 is a flow chart illustrating the method of the present invention.

FIG. 7 is a flow chart illustrating the method of the present invention. In FIG. 7, a method 100 for responding to a failure of a failed hardware locus of a plurality of hardware loci at a communication installation begins at a START locus 102. The installation includes a plurality of control apparatuses distributed among the plurality of hardware loci for controlling a plurality of processes. Each respective process of the plurality of processes is controlled by one of a respective first control apparatus of the plurality of control apparatuses or a respective second control apparatus of the plurality of control apparatuses. The respective first control apparatus and the respective second control apparatus associated with a particular respective process are located at different hardware loci of the plurality of hardware loci. The plurality of hardware loci includes at least one spare hardware locus. No respective first control apparatus and no respective second control apparatus are initially located at any respective spare hardware locus.

Method 100 continues with the step of shifting control of a failed process from an initial control apparatus to an alternate control apparatus located at an alternate hardware locus than the failed hardware locus, as indicated by a block 104. The failed process is a respective process controlled by one control apparatus of the first control apparatus and the second control apparatus located at the failed hardware locus. The alternate control apparatus is the other control apparatus of the first control apparatus and the second control apparatus. The alternate hardware locus is the respective hardware locus at which is located the other control apparatus.

Method 100 continues with the step of relocating the respective control apparatuses located at the failed hardware locus to a respective spare hardware locus of the plurality of hardware loci, as indicated by a block 106.

Method 100 continues with the step of shifting control of the failed process from the other control apparatus to the one control apparatus now located at the respective spare hardware locus, as indicated by a block 108. Method 100 terminates at an END block 110.

Those skilled in the art will recognize improvements and modifications to the preferred embodiments of the present invention. All such improvements and modifications are considered within the scope of the concepts disclosed herein and the claims that follow.

What is claimed is:

1. A method for responding to a failure of a failed hardware locus of a plurality of hardware loci at a communication installation; said installation including a plurality of control apparatuses distributed among said plurality of hardware loci for controlling a plurality of processes; the method comprising the steps of:
    (a) arranging said plurality of control apparatuses among said plurality of hardware loci:
        (1) to co-locate a plurality of said control apparatuses substantially at each said hardware locus;
        (2) to avoid co-locating respective said control apparatuses of said plurality of control apparatuses associated with a respective process of said plurality of processes at a same hardware locus; and
        (3) to avoid co-locating more than one respective said control apparatus in active control of any said respective process at a same hardware locus;
    (b) shifting control of a failed process from an initial control apparatus of said plurality of control apparatuses to an alternate control apparatus of said plurality of control apparatuses located at an alternate hardware locus other than said failed hardware locus; said failed process being a respective said process controlled by said initial control apparatus located at said failed hardware locus;
    (c) relocating said respective control apparatuses located at said failed hardware locus to a respective spare hardware locus of said plurality of hardware loci; neither an initial control apparatus nor an alternate control apparatus having been initially located at said respective spare hardware locus;
    (d) shifting control of said failed process from said alternate control apparatus to said initial control apparatus; said initial control apparatus being located at said respective spare hardware locus.

2. A method for responding to a failure of a failed hardware locus of a plurality of hardware loci at a communication installation as recited in claim 1 wherein each respective process of said plurality of processes is controlled by one of a respective first control apparatus of said plurality of control apparatuses or a respective second control apparatus of said plurality of control apparatuses.

3. A method for responding to a failure of a failed hardware locus of a plurality of hardware loci at a communication installation as recited in claim 2 wherein said respective first control apparatus and said respective second control apparatus associated with a particular said respective process are located at different hardware loci of said plurality of hardware loci.

4. A method for responding to a failure of a failed hardware locus of a plurality of hardware loci at a communication installation as recited in claim 1 wherein each said respective hardware locus is embodied in a plurality of computer server units.

5. A method for responding to a failure of a failed hardware locus of a plurality of hardware loci at a communication installation as recited in claim 1 wherein each said respective hardware locus hosts two or more control apparatuses of said plurality of control apparatuses.

6. A method for responding to a failure of a failed hardware locus of a plurality of hardware loci at a communication installation as recited in claim 4 wherein each respective process of said plurality of processes is controlled by one of a respective first control apparatus of said plurality of control apparatuses or a respective second control apparatus of said plurality of control apparatuses.

7. A method for responding to a failure of a failed hardware locus of a plurality of hardware loci at a communication installation as recited in claim 6 wherein said respective first control apparatus and said respective second control apparatus associated with a particular said respective process are located at different hardware loci of said plurality of hardware loci.

8. A method for responding to a failure of a failed hardware locus of a plurality of hardware loci at a communication installation as recited in claim 4 wherein each said respective hardware locus hosts two or more control apparatuses of said plurality of control apparatuses.

9. A method for responding to a failure of a failed hardware locus of a plurality of hardware loci at a communication installation as recited in claim 8 wherein each respective process of said plurality of processes is controlled by one of a respective first control apparatus of said plurality of control apparatuses or a respective second control apparatus of said plurality of control apparatuses.

10. A method for responding to a failure of a failed hardware locus of a plurality of hardware loci at a communication installation as recited in claim 9 wherein said respective first control apparatus and said respective second control apparatus associated with a particular said respective process are located at different hardware loci of said plurality of hardware loci.

11. A system for effecting continuity of operation in response to failure of a failed hardware locus of a plurality of hardware loci at a communication installation; said installation including a plurality of control apparatuses distributed among said plurality of said plurality of hardware loci for controlling a plurality of processes; each respective process of said plurality of processes being controlled by one of a respective first control apparatus of said plurality of control apparatuses or a respective second control apparatus of said plurality of control apparatuses; said respective first control apparatus and said respective second control apparatus associated with a particular said respective process being located at different hardware loci of said plurality of hardware loci; the system comprising:
    a control unit coupled with said plurality of control apparatuses; said plurality of control apparatuses being arranged among said plurality of hardware loci: (1) to co-locate a plurality of said control apparatuses substantially at each said hardware locus; (2) to avoid co-locating respective said control apparatuses of said plurality of control apparatuses associated with a respective process of said plurality of processes at a same hardware locus; and (3) to avoid co-locating more than one respective said control apparatus in active control of any said respective process at a same hardware locus;

said control unit effecting a shifting of control of a failed process to an alternate control apparatus located at an alternate hardware locus than said failed hardware locus;

said failed process being a respective said process controlled by one control apparatus of said first control apparatus and said second control apparatus located at said failed hardware locus;

said alternate control apparatus being the other control apparatus of said first control apparatus and said second control apparatus than said one control apparatus;

said alternate hardware locus being said respective hardware locus at which is located said other control apparatus;

said control unit effecting relocation of said respective control apparatuses located at said failed hardware locus to a respective spare hardware locus of said plurality of hardware loci; no said respective first control apparatus and no said respective second control apparatus being initially located at said respective spare hardware locus;

said control unit effecting a shifting of control of said failed process from said other control apparatus to said one control apparatus;

said one control apparatus being at said respective spare hardware locus.

12. A system for effecting continuity of operation in response to failure of a failed hardware locus of a plurality of hardware loci at a communication installation as recited in claim 11 wherein each said respective hardware locus is embodied in a plurality of computer server units.

13. A system for effecting continuity of operation in response to failure of a failed hardware locus of a plurality of hardware loci at a communication installation as recited in claim 11 wherein each said respective hardware locus hosts two or more control apparatuses of said plurality of control apparatuses.

14. A system for effecting continuity of operation in response to failure of a failed hardware locus of a plurality of hardware loci at a communication installation as recited in claim 12 wherein each said respective hardware locus hosts two or more control apparatuses of said plurality of control apparatuses.

15. A method for responding to a failure of a failed hardware locus of a plurality of hardware loci at a communication installation; said installation including a plurality of control apparatuses distributed among said plurality of hardware loci for controlling a plurality of processes; each respective process of said plurality of processes being controlled by one of a respective first control apparatus of said plurality of control apparatuses or a respective second control apparatus of said plurality of control apparatuses; said respective first control apparatus and said respective second control apparatus being associated with a particular said respective process being located at different hardware loci of said plurality of hardware loci; the method comprising the steps of:

(a) arranging said plurality of control apparatuses among said plurality of hardware loci:
  (1) to co-locate a plurality of said control apparatuses substantially at each said hardware locus;
  (2) to avoid co-locating respective said control apparatuses of said plurality of control apparatuses associated with a respective process of said plurality of processes at a same hardware locus; and
  (3) to avoid co-locating more than one respective said control apparatus in active control of any said respective process at a same hardware locus;

(b) shifting control of a failed process to an alternate control apparatus located at an alternate hardware locus other than said failed hardware locus; said failed process being a respective said process controlled by one control apparatus of said first control apparatus and said second control apparatus located at said failed hardware locus; said alternate control apparatus being an other control apparatus than said one control apparatus; said alternate hardware locus being said respective hardware locus at which is located said other control apparatus;

(c) relocating said respective control apparatuses located at said failed hardware locus to a respective spare hardware locus of said plurality of hardware loci; no said respective first control apparatus and no said respective second control apparatus being initially located at said respective spare hardware locus;

(d) shifting control of said failed process from said other control apparatus to said one control apparatus; said one control apparatus being located at said respective spare hardware locus.

16. A method for responding to a failure of a failed hardware locus of a plurality of hardware loci at a communication installation as recited in claim 15 wherein each said respective hardware locus is embodied in a plurality of computer server units.

17. A method for responding to a failure of a failed hardware locus of a plurality of hardware loci at a communication installation as recited in claim 15 wherein each said respective hardware locus hosts two or more control apparatuses of said plurality of control apparatuses.

18. A method for responding to a failure of a failed hardware locus of a plurality of hardware loci at a communication installation as recited in claim 16 wherein each said respective hardware locus hosts two or more control apparatuses of said plurality of control apparatuses.

* * * * *